US010505327B1

(12) United States Patent
Patwardhan

(10) Patent No.: US 10,505,327 B1
(45) Date of Patent: Dec. 10, 2019

(54) ORIENTATION AGNOSTIC ELECTRICAL CONNECTOR

(71) Applicant: Satyajit Patwardhan, Fremont, CA (US)

(72) Inventor: Satyajit Patwardhan, Fremont, CA (US)

( * ) Notice: Subject to any disclaimer, the term of this patent is extended or adjusted under 35 U.S.C. 154(b) by 0 days.

(21) Appl. No.: 15/844,552

(22) Filed: Dec. 17, 2017

(51) Int. Cl.

| | |
|---|---|
| ***H01H 1/18*** | (2006.01) |
| ***B60L 11/18*** | (2006.01) |
| ***H01R 13/71*** | (2006.01) |
| ***H01R 29/00*** | (2006.01) |
| ***H01R 35/02*** | (2006.01) |
| ***H01R 39/08*** | (2006.01) |

(52) U.S. Cl.
CPC .......... *H01R 35/02* (2013.01); *B60L 11/1818* (2013.01); *H01H 1/18* (2013.01); *H01R 13/71* (2013.01); *H01R 29/00* (2013.01); *H01R 39/08* (2013.01); *H01R 2201/26* (2013.01)

(58) Field of Classification Search
CPC ........ H01R 35/02; H01R 29/00; H01R 39/08; H01R 13/71; H01R 2201/26; H01R 35/00; H01R 35/04; H01R 31/06; H01H 1/18; H01H 1/36; H01H 19/10; B60L 11/1818
USPC ........ 439/188, 217, 218; 200/570, 571, 241, 200/252
See application file for complete search history.

(56) References Cited

U.S. PATENT DOCUMENTS

| | | | | |
|---|---|---|---|---|
| 2,649,513 | A * | 8/1953 | Luhn | G06F 1/0314 200/11 D |
| 6,674,183 | B1 * | 1/2004 | Noda | H01H 19/58 200/571 |
| 7,726,994 | B1 * | 6/2010 | Willey | A42B 3/042 439/218 |
| 8,226,419 | B2 * | 7/2012 | Fonzo | H01R 35/02 439/11 |
| 8,597,059 | B2 * | 12/2013 | Bucheru | H01R 29/00 439/650 |
| 8,905,764 | B2 * | 12/2014 | Cheng | H01R 39/64 439/24 |

(Continued)

*Primary Examiner* — Gary F Paumen

(57) ABSTRACT

The invention teaches how to establish 1 to 1 connection between a first group of n electrical signals to a second group of n electrical signals. A first connector half with a first group of n1 contacts equally spaced around a circle and a second connector half with a second group n2 connectors, also equally spaced around a circle, with $n1-1=n2\geq n$. The angular extent of the individual contacts from the first group is e1, and that from the second group is e2. The angular extent of the gap between individual contacts from the second group is g2. Following relationship must be satisfied: $e1<g2$ and $e2>(360/n1-e1)$.

A switch interconnect means for connecting arbitrarily selected n contacts out of a first group of n1 contacts where $(n1-1)\geq n$ to n signals from a first group of n signals. The minimum number of signals required for doing this is $n+(n1-n)*n$. A single pole switch is connected from each of the n signals from the first group to each of the n arbitrarily selected contacts from the first group of n1 contacts. Each of the remaining n1−n contacts from first group, is connected to one end of a group of n switches. The other end of each switch from this group of switches is connected to each of the n signals from second group.

1 Claim, 7 Drawing Sheets

(56) References Cited

U.S. PATENT DOCUMENTS

| | | | | |
|---|---|---|---|---|
| 9,028,261 | B2 * | 5/2015 | Makinen | H01R 35/00<br>439/63 |
| 9,160,100 | B2 * | 10/2015 | Du | H01R 13/5841 |
| 9,325,134 | B2 * | 4/2016 | Lopez | H01R 35/00 |
| 9,502,847 | B2 * | 11/2016 | Sung | H01R 35/00 |
| 9,673,585 | B2 * | 6/2017 | Tsushima | B60R 16/027 |
| 9,698,551 | B2 * | 7/2017 | Evans | H01R 35/00 |
| 2014/0291129 | A1 * | 10/2014 | Hallet | H01H 1/023<br>200/61.54 |

* cited by examiner

ORIENTATION AGNOSTIC ELECTRICAL CONNECTOR

FIELD OF THE INVENTION AND PRIOR ART RELATED TO THE INVENTION

The field of invention is electrical connectors. Specifically, the connectors that tolerate rotational misalignments. The basic techniques prevalent in the prior for transferring electrical energy across a swivel joint can be summarized into three categories: (i) a flexible, twistable or bendable cable that connects across the swivel and compensate for the swivel's motion. At one or both ends of the cable is a traditional detachable connector, (ii) an axial or radial slip ring or variant, (iii) integrating a rotary switch into the connector where a wiper can rotate to meet discrete contacts disposed along a circle. A search of prior art in class CPC/H01R35/00 reveals several examples of all of the three categories. Each of these techniques have certain limitations as described below.

(i) Flexible Wire Type: U.S. Pat. No. 9,673,585; U.S. Pat. No. 9,325,134; U.S. Pat. No. 9,698,551, U.S. Pat. No. 9,160,100 disclose a connector which takes with it a cable that twists around to compensate for the swivel motion. Here, (a) the actual pieces across which the connector is split, still require precise alignment during mating, and this type of designs cannot be used if the rotational misalignment is across the two halves of the connector, (b) he twisting cable limits the life of the connector, (c) the swivel has to be large enough to be able to accommodate the cable, (d) being a twisting cable, it is required to be thin. Consequently, it's a challenge to apply such technique to large current connector.

(ii) Slip Ring Type: U.S. Pat. No. 8,905,764 and U.S. Pat. No. 9,028,261 disclose traditional slip rings. The former is an axial and the latter is a radial slip ring design, both of which assign dedicated conductors for each signal. As a result, these designs need significantly more axial or radial space as the case may be. Furthermore, the slip rings and contacts are assembled permanently or quasi permanently as opposed to being on separable halves of mating connector. Thus, the final mating pin-and socket, i.e. the detachable parts of the connector still need precise alignment with respect to each other. Additional examples include U.S. Pat. No. 9,130,330 which discloses a radial liquid contact slip ring.

(iii) Rotary Switch Type: U.S. Pat. Nos. 9,502,847, 8,597,059 disclose a connector that is a combination of a rotary switch and a plug. This can connect electricity only in few discrete angular positions. Due to the fundamental limitation of break-before make requirement, the connector cannot transfer energy when connector orientation does not match the few discrete functional positions.

As described above, each of the techniques described in prior are have shortcomings that limit their use for a high current, compact connector that can tolerate rotational misalignment. With the re-birth of electric vehicles (EVs), their charging system and in particular automatic or robotic charging system is fast becoming key enabling technology. At the core of such as charging system is a high current capacity connector, that is compact and can tolerate several degrees of misalignment. The connector's tolerance to rotational misalignment allows for robot to have one less degree of freedom, thus reducing complexity of end effector as well as the overall robot. The chassis of an EV or for that matter any vehicle is floating on its suspension springs and consequently the charge port attached to the chassis of a parked EV can still move several inches when for example, the drive closes the door, or puts groceries in the car. A robot plugging into the charge port or the charge port itself could easily get damaged when the EV chassis moves. Connector disclosed in this invention allows for the at least one of the necessary degrees of freedom, while safely delivering large charging currents.

DETAILED DESCRIPTION OF THE INVENTION

Electrical power connectors have two halves, each carrying a group of connectors. These connector halves are brought together to mate with each other in a particular relative orientation. Frequently, the connectors have mechanical guides on one or both halves to guide the mating process into correct orientation such that each of the contacts from the first half mates with its matching counterpart from the second half. This invention teaches a contactor design that eliminates need for precise angular orientation of two halves of a power connector.

Figure 1:
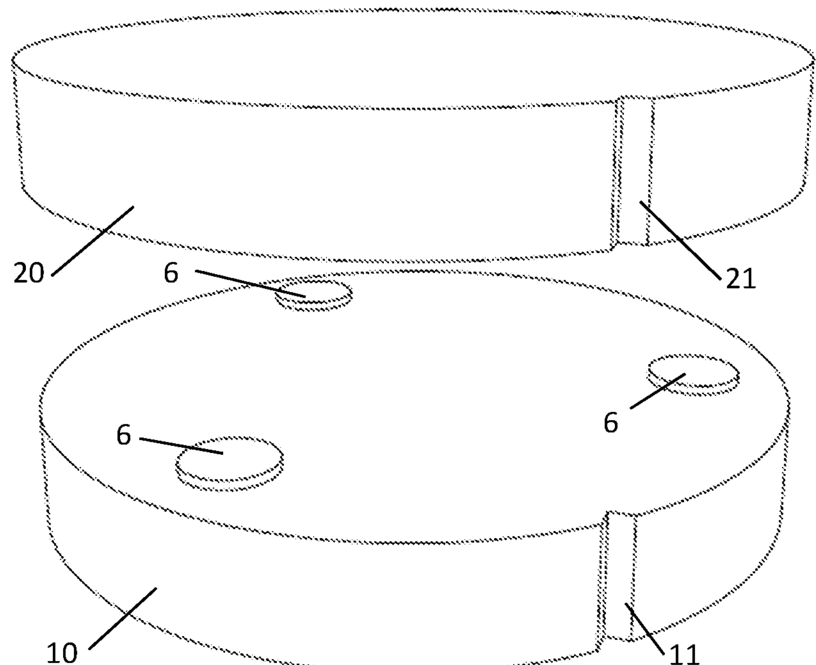
FIG. 1: Connector agnostic to angular orientation: Isometric view, disengaged position.
Figure 2:
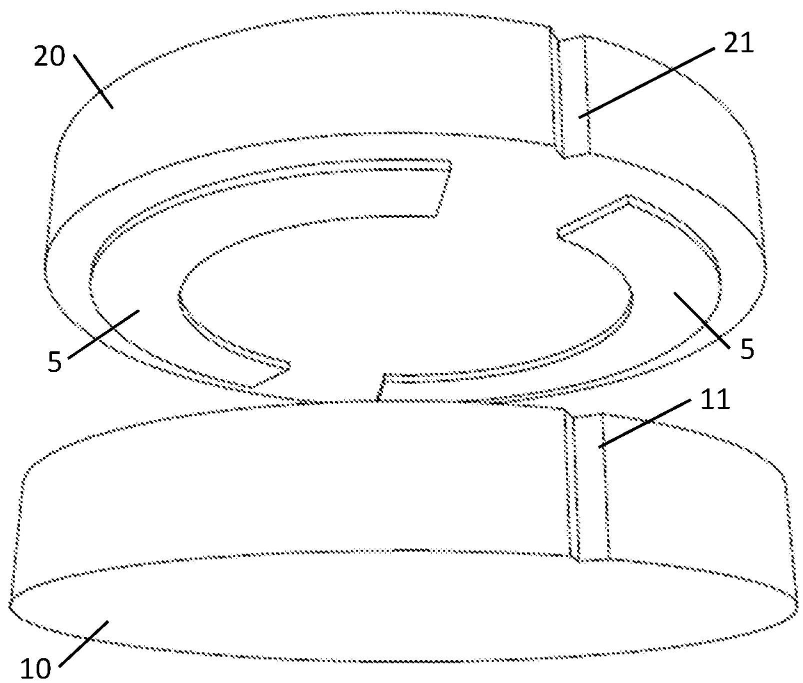
FIG. 2: Connector agnostic to angular orientation: Isometric view, disengaged position.
Figure 3:
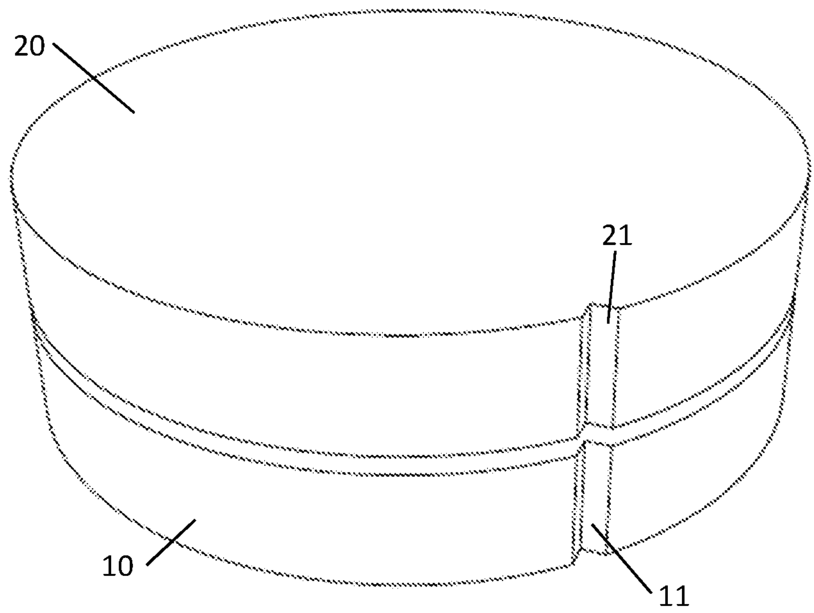
FIG. 3 Connector agnostic to angular orientation: Isometric view, engaged and aligned position.
Figure 4:
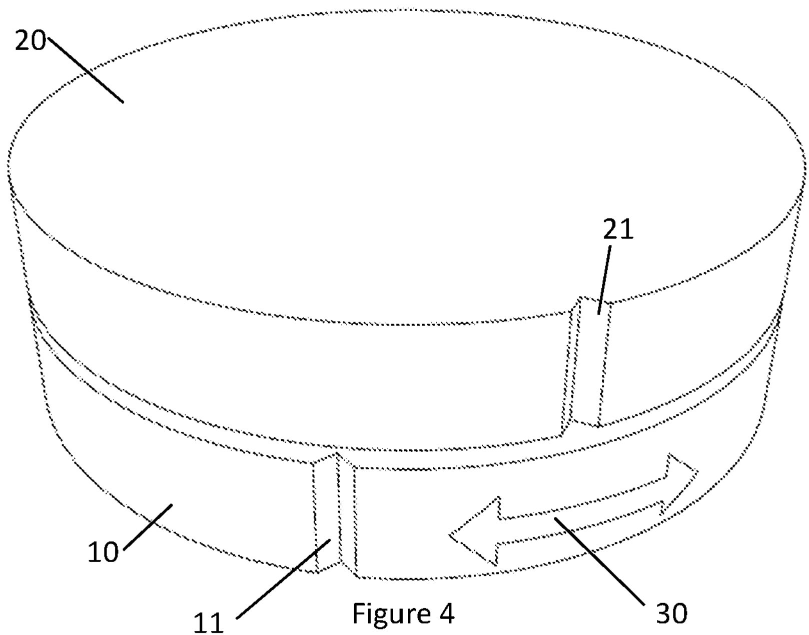
FIG. 4 Connector agnostic to angular orientation: Isometric view, engaged and miss-aligned position.

The Arrangement:

One of the embodiments of this invention is shown in FIG. 1 and FIG. 2. It comprises of two halves 10 and 20. Where 10 carries a group of contractors 6, and 20 carries a group of connectors 5. For the purpose of visualization two marking notches 11 and 21 are inscribed on the lateral surfaces of 10 and 20 respectively. It should be noted that 11 and 21 do not play any role in the functioning of the connector. These two halves 10 and 20 mate as shown in FIG. 3 and FIG. 4. Here, FIG. 3 shows the basic configuration of the two halves 10 and 20 after mating. Additionally, as shown in FIG. 4, this innovation teaches contactor design that allows 10 and 20 to mate in any angular orientation 30. If a robot were to bring the two halves 10 and 20 together, this innovation allows the robot to not need a rotational actuator to align the two halves in direction 30.

Figure 5:
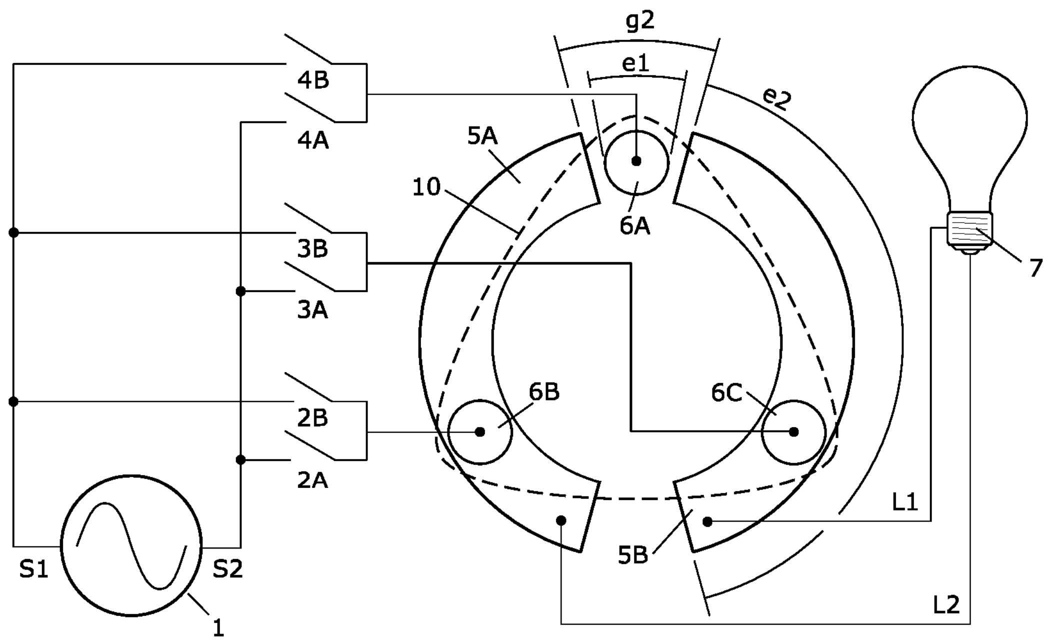
FIG. 5 Contact topology for a connector agnostic to angular orientation and overall system connections: Top view.

FIG. 5 shows the top view of one embodiment of the invention. This embodiment is meant to connect n=2 electrical signals marked as S1 and S2 with a second group of electrical signals marked as L1 and L2. Just as an example, S1 and S2 are shown to emerge from an electricity source 1, and L1 and L2 are terminating into an electrical load 7. However it is not necessary for the first and send group of electrical signals to be source and load respectively. FIG. 5 shows the first set of n1 count of contacts 6A, 6B and 6C mounted on the first half 10, with n1=3. As seen in FIG. 5, some of the contacts 6A, 6B, and 6C connect with contacts from the second group of n2 count of contacts 5A and 5B with n2=2, mounted on second half 20 (not shown in FIG. 5). It should be noted that $n2=n1-1\geq n$. The first group of contacts 6A, 6B, and 6C are evenly spaced around a circle with each contact having an angular extent of e1. The contacts 5A and 5B are also evenly spaced around a circle with the gaps between them having an angular extend of g2 and the contacts themselves having an angular extent of e2. It's clear that e2 and g2 are not independent, but are related by: $360=n2\times(e2+g2)$. The geometry is arranged such that $e1<g2$ and that $e2>(360/n1-e1)$. This ensures that any one of 6A, 6B or 6C never bridges the gap between 5A and 5B, thus never short circuiting 5A with 5B. Also, there will be at least one contact from the first group that will connect with each of the contacts from the second group.

Each of the first group of contacts 6A, 6B and 6C is connected to first terminal of a pair of switches. Specifically, 6A is connected to one end of each of the two switches from the first pair 4A and 4B, 6B is connected to one end of each of the two switches from the second pair 2A and 2B and 6C is connected to one end of each of the two switches from the third pair 3A and 3B. The remaining end of first switch from each of the first, second and third pairs is connected to S1. The remaining end of second switch from each of the first, second and third pairs is connected to S1 (see FIG. 5). When 2A, 2B, 3A, 3B, 4A and 4B are correctly configures, either S1 or S2 can be connected to any one the contacts 6A, 6B or 6C. When n=n2, as is the case in this embodiment, each of the contacts from the second group is connected directly to a unique signal from the second group. For example in this embodiment, 5A is connected to L2 and 5B is connected to L1.

Figure 6:
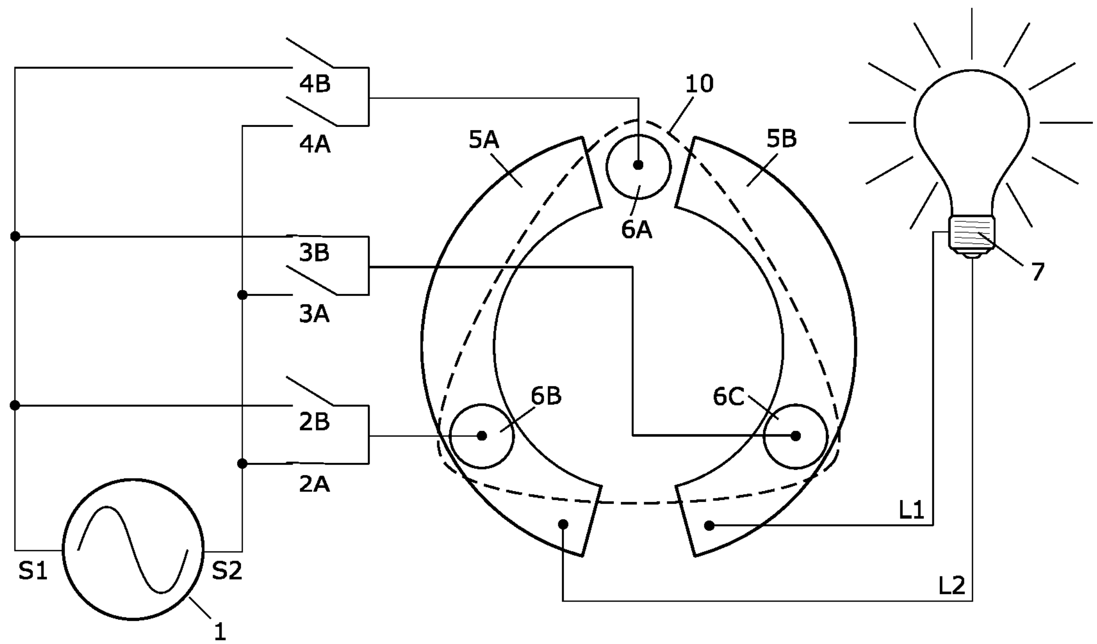
FIG. 6 Contact topology for a connector agnostic to angular orientation and overall system connections: Top view.
Figure 7:
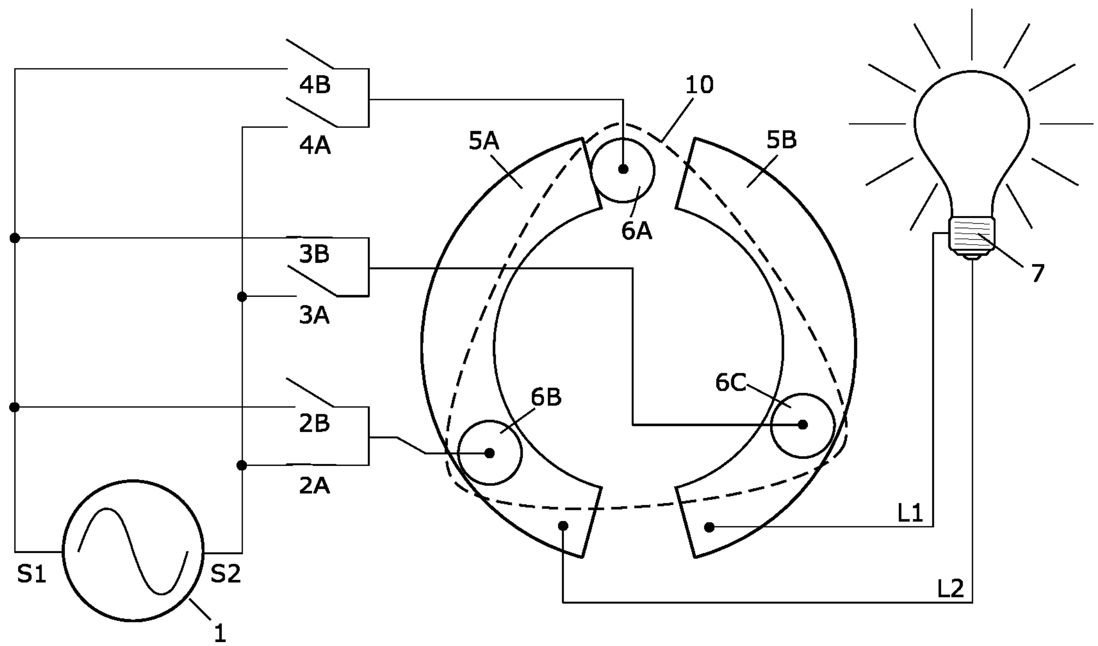
FIG. 7 Contact topology for a connector agnostic to angular orientation and overall system connections: Top view.
Figure 8:
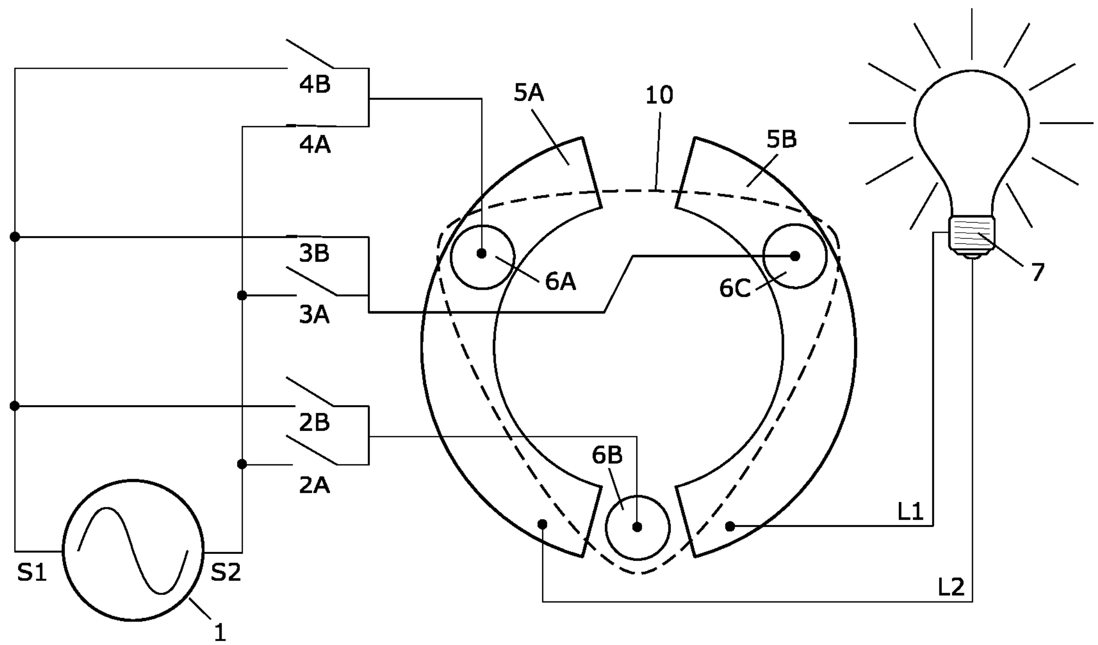
FIG. 8 Contact topology for a connector agnostic to angular orientation and overall system connections: Top view.

Operation: FIG. 6, FIG. 7 and FIG. 8 show the two connector halves at different orientations with respect to each other. Stating from the picture in FIG. 6; FIG. 7 and FIG. 8 show how the contacts progressively dispose themselves when first contactor half 10 rotates counterclockwise with respect to second contactor half 20. As seen in FIG. 7, 6A—which was previously disconnected, comes in contact with 5A, much before 6B departs away from 5A. By the time 6B fully departs from 5A as seen in FIG. 8, 6A has fully established contact with 5A. Thus, at any rotational misalignment, the minimum required number of conduction paths are always available. All that is needed is for the control circuitry to figure out the rotational position and configure switches 2A, 2B, 3A, 3B, 4A and 4B appropriately as shown in FIG. 6, FIG. 7 and FIG. 8. This configuration can be either set manually or automatically by a microprocessor.

Advantages

The invention disclosed here uses a single ring for establishing all conduction paths. As a result, the mating surface and contacts have several desirable features: (i) The individual contacts can be made larger by taking advantage of the space saving design of single ring of contacts. This is particularly important for handling very high currents as the larger contacts not only allow for good sized contact surface and a large conductive body, but are also capable for dissipating any heat generated. (ii) This invention allows mating connector halves to tolerate rotational misalignment. This is important to be able to reduce the number of actuators required if the two mating halves are brought together mechanically.

Figure 9:
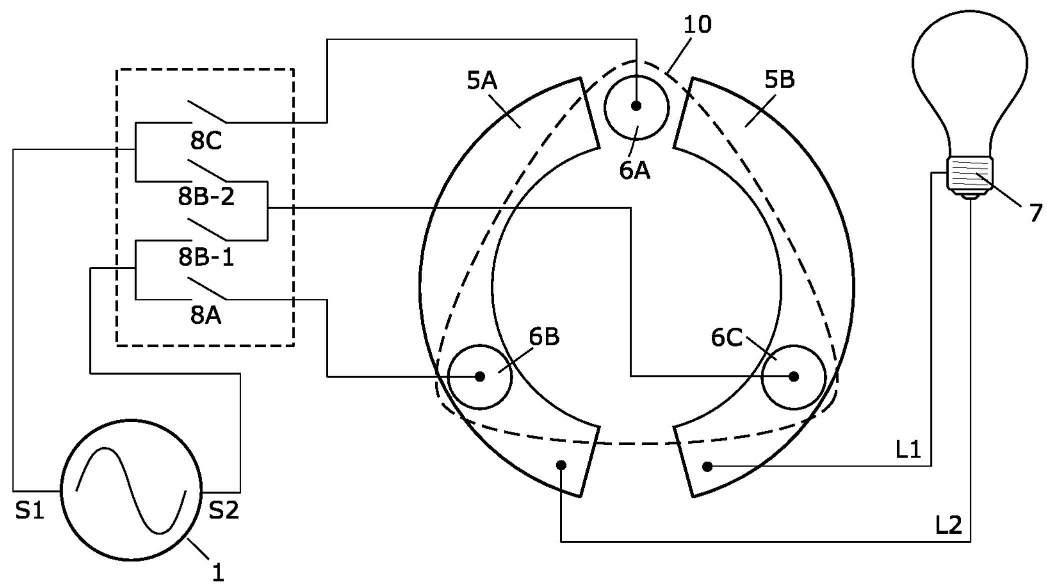
FIG. 9 Contact topology for a connector agnostic to angular orientation and system connections optimized to minimize switch count: Top view.
Figure 10:
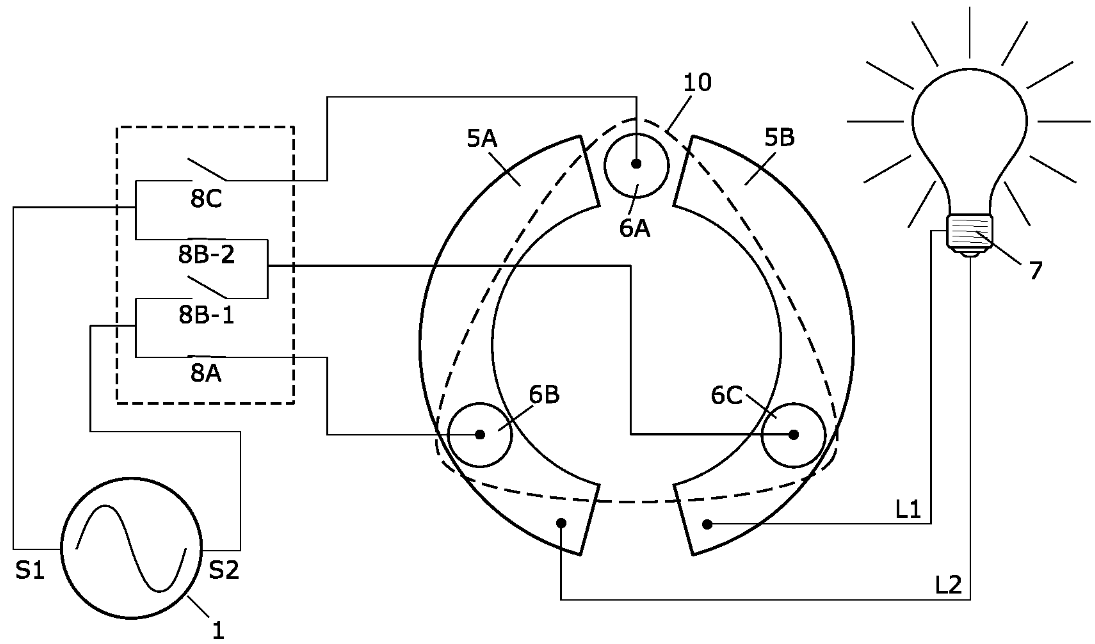
FIG. 10 Contact topology for a connector agnostic to angular orientation and system connections optimized to minimize switch count: Top view.

Refinement 1:

The embodiment in FIG. 5 uses six switches (n*n1). This arrangement allows connecting one particular signal from the first group (S1 or S2) to any one of the signals from second group (L1 or L2). In other words, the arrangement in FIG. 5 allows S1 to be connected to L1 or L2 without any constraint. Likewise S2 can also be connected either to L1 or L2. Actual connection configuration can be chosen by the end user. However, if this degree of freedom is not required, but the only requirement is to connect S1 to one of the L1 and L2, and S2 to the other, then the number of switches can be reduced to 4 which is $(n1-n)*n+n$, which is always less than n*n1). The specific arrangement for n=2 and n1=3 is shown in FIG. 9, which comprises of switches 8A, 8B-1, 8B-2 and 8C. The FIG. 9 shows the switches in open state and the FIG. 10 shows the switches in correct configuration to connect S1 and S2 to 6C and 6B respectively, which in turn connect with 5B and 5A respectively, which in turn connect to L1 and L2 respectively. Note that with the reduced number of switches, S1 to L1 and S2 to L2 is the only possible connection available in the configuration in FIG. 10. Typically, this is not a concern if the load or source is polarity agnostic, e.g. as is the case when 1 is an AC source and/or 7 is a resistive load.

Figure 11:
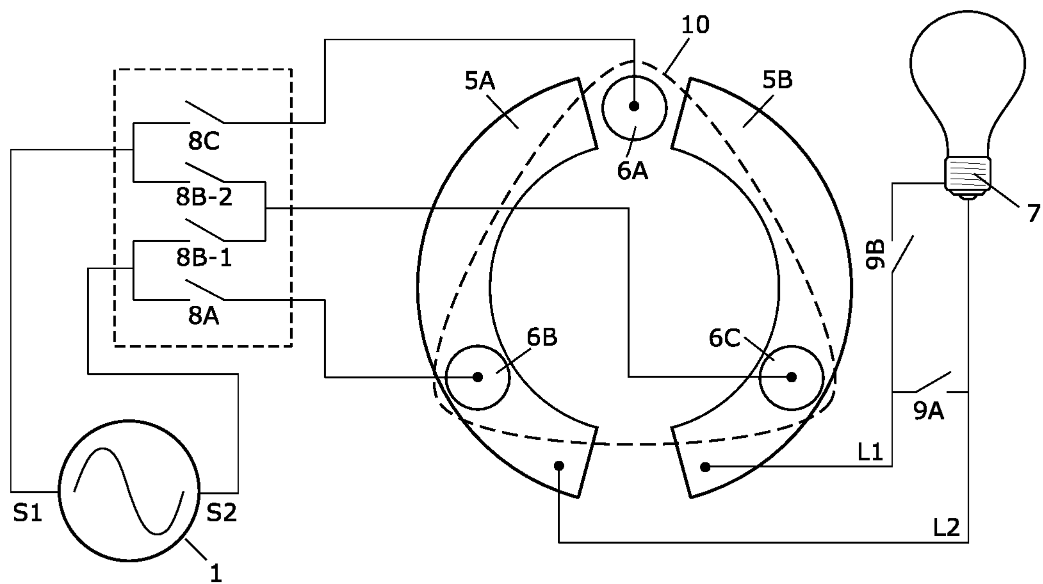
FIG. 11 Contact topology for a connector agnostic to angular orientation and system connections optimized to minimize switch count+hardware to detect the contact disposition.
Figure 14:
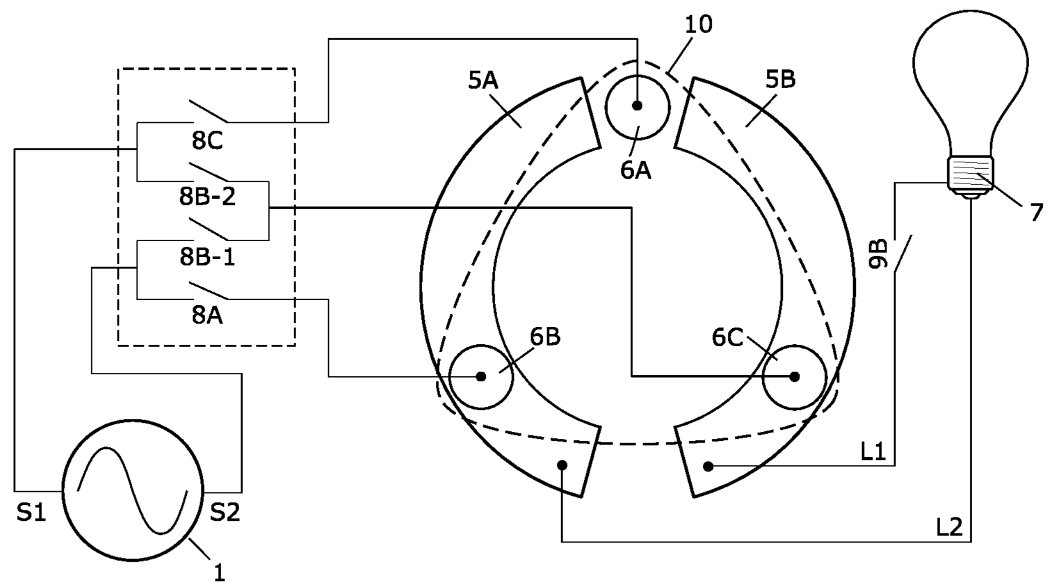
FIG. 14 Contact topology for a connector agnostic to angular orientation and system connections optimized to minimize switch count+hardware to detect the contact disposition, with one less switch.

Refinement 2:

In order to configure the group of switches 2A, 2B, 3A, 3B, 4A, 4B or the group of switches 8A, 8B-1, 8B-2, 8C; one needs to know which contacts 6A, 6B and 6C from the first group have connected with which particular contacts 5A or 5B from the second group. One approach is the use an encoder or an equivalent orientation sensor to measure relative orientation between 10 and 20. However, this could be expensive. Instead this invention teaches a novel approach of adding two switches 9A and 9B to signal paths for L1 and L2 as shown in FIG. 11. By using a specific sequence of switch configurations and continuity checks, a microprocessor or a human being can figure out how to configure the switches 2A, 2B, 3A, 3B, 4A, 4B or 8A, 8B-1, 8B-2, 8C. These steps are listed below:

Step 1: Disconnect 6A, 6B and 6C from S1 as well as S2. This means opening all of the switches 2A, 2B, 3A, 3B, 4A, 4B or 8A, 8B-1, 8B-2, 8C. Also disconnect 5A and 5B from load or from each other. This means open 9A and 9B. See FIG. 11. Please note that the switch 9A is optional if (i) load 7 is capable of withstanding the small voltage used during the continuity checks used during this procedure and (ii) offers a low resistance that is detectable by continuity checks used during this procedure and in that case circuit of FIG. 11 can be simplified to circuit of FIG. 14

Step 2: Perform pairwise continuity check on 6A, 6B and 6C. The outcomes are all contacts are open, or two of them show short circuit. This represents the orientation shown in FIG. 7, where 6A and 6B are electrically connected by 5A.

Figure 12:
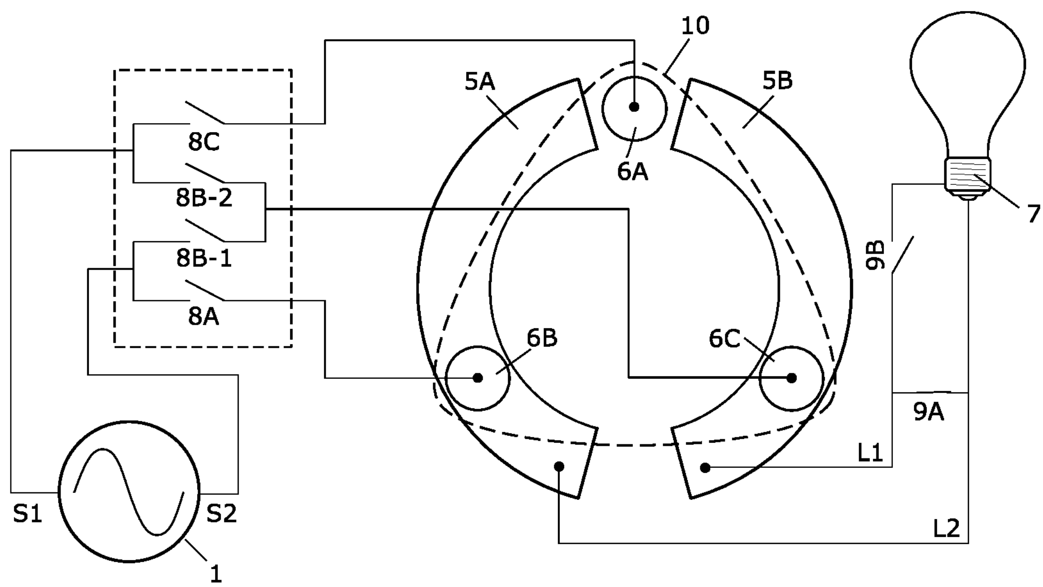
FIG. 12 Contact topology for a connector agnostic to angular orientation and system connections optimized to minimize switch count+hardware to detect the contact disposition.

Step 3: Close the switch 9A. See FIG. 12.

Step 4: Perform pairwise continuity check on 6A, 6B and 6C. The outcomes are:

i. all contacts short circuited to each other (when 10 and 20 are oriented as shown in FIG. 7 i.e. when 6A and 6B are shorted through 5A and 6C is shorted to 5A through the pathway: 6C→5B→9A→5A→{6A and 6B}).

ii. one pair is short circuited (when 10 and 20 are oriented as shown in FIG. 6 or FIG. 8). The short circuit is through 9A only.

Figure 13:
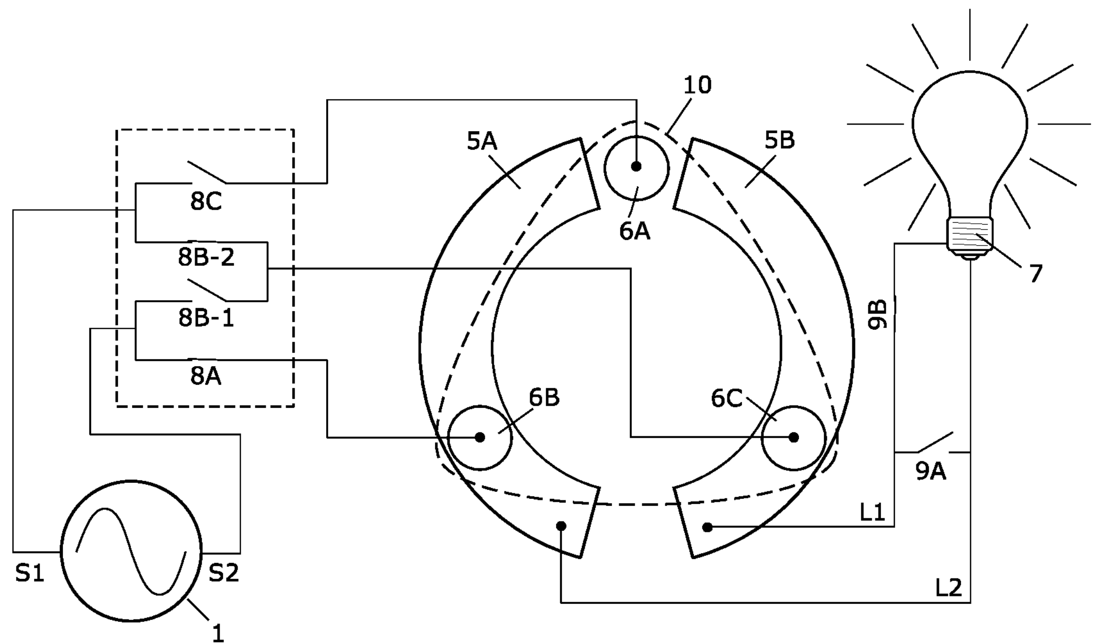
FIG. 13 Contact topology for a connector agnostic to angular orientation and system connections optimized to minimize switch count+hardware to detect the contact disposition.

Step 5: Open switch 9A. Close switch 9B. See FIG. 13.

Step 6: Combining the results of Step 2 and Step 4, one can understand which of the 6A, 6B or 6C are connected to 5A and 5B. Configure switches 2A, 2B, 3A, 3B, 4A, 4B or witch 8A, 8B-1, 8B-2, 8C appropriately.

Application:

One of the important application of this technology is in the field of robotic hands-free charging of electric vehicles (EVs). In this application, a robot end effector would be installed with one half of an EV charging connector, and the other half would be installed on the electric vehicle. When the EV is to be charged, the robot would move its end effector and the attached connector half to bring it next to the connector half mounted on the EV. If this connector is to be designed as described in this invention, the Robot would not need to angularly align the two connector halves. This way, the robot end effector complexity can be reduced.

Another application is in the field of slip rings. In the traditional design of slip rings, each individual connection being transmitted across has its own dedicated ring. With the principle described in in this invention, multiple connections can be integrated into single slip ring that is peripherally segmented. This does add the complication of extra switching, as well as continuous monitoring of slip ring configuration. However, it allows for a significantly smaller slip ring design to be realized.

A third application is in the field of aerial drone recharging stations. The drone can simple land on the charging pad and not worry about the rotational alignment. The drone's landing gear will be fashioned as a ring, forming one half of the charging connector, and the charging pad surface will have appropriate mating connector embedded in it.

SUMMARY

The invention teaches how to establish 1 to 1 connection between a first group of n electrical signals to a second group of n electrical signals. A first connector half with a first group of n1 contacts equally spaced around a circle and a second connector half with a second group n2 connectors, also equally spaced around a circle, with $n1-1=n2\geq n$. The angular extent of the individual contacts from the first group is e1, and that from the second group is e2. The angular extent of the gap between individual contacts from the second group is g2. Following relationship must be satisfied: $e1<g2$ and $e2>(360/n1-e1)$.

A switch interconnect means for connecting arbitrarily selected n contacts out of a first group of n1 contacts where $(n1-1)\geq n$ to n signals from a first group of n signals. The minimum number of signals required for doing this is $n+(n1-n)*n$. A single pole switch is connected from each of the n signals from the first group to each of the n arbitrarily selected contacts from the first group of n1 contacts. Each of the remaining n1−n contacts from first group, is connected to one end of a group of n switches. The other end of each switch from this group of switches is connected to each of the n signals from second group.

What is presented in this patent application are only few representative embodiments of the core innovation. There are countless situations where this innovation can be applied. Any variant embodiments of this innovation are anticipated by this disclosure and hence are to be considered as part of this patent.

The invention claimed is:

1. An orientation agnostic electrical connector, comprising:

a. a first group of n electrical signals, b. a second group of n electrical signals, c. a first connector half with a first group of n1 contacts equally spaced around a circle or centerline diameter D, d. a second connector half with a second group of n2 contacts, also equally spaced around a circle of centerline diameter D, e. with $n1-1=n2\geq n$, f. with the angular extent of the individual contacts from the first group to be e1, g. with the angular extent of the individual contacts from the second group to be e2, h. with the angular extent of the gap between individual contacts from the second group to be g2, i. and that $e1<g2$, j. and that $e2>(360/n1-e1)$, k. a switch interconnect means for connecting arbitrarily selected n contacts out of a first group of n1 contacts to n signals from a first group of n signals.

* * * * *